US012088355B2

(12) United States Patent
Mielens et al.

(10) Patent No.: US 12,088,355 B2
(45) Date of Patent: Sep. 10, 2024

(54) REDUCTION OF EMULATED CHANNEL COUNT FOR PHASED-ARRAY SYSTEMS THROUGH ANGLE-OF-ARRIVAL PROCESSING

(71) Applicant: NATIONAL INSTRUMENTS CORPORATION, Austin, TX (US)

(72) Inventors: Jeremy Mielens, Corpus Christi, TX (US); John Ammerman, Spokane, WA (US); Aljosa Vrancic, Lexington, MA (US); Andrew Lynch, Austin, TX (US)

(73) Assignee: National Instruments Corporation, Austin, TX (US)

( * ) Notice: Subject to any disclaimer, the term of this patent is extended or adjusted under 35 U.S.C. 154(b) by 156 days.

(21) Appl. No.: 18/045,354

(22) Filed: Oct. 10, 2022

(65) Prior Publication Data

US 2023/0123930 A1 Apr. 20, 2023

Related U.S. Application Data

(60) Provisional application No. 63/257,265, filed on Oct. 19, 2021.

(51) Int. Cl.
*H04B 17/16* (2015.01)
*H04B 17/00* (2015.01)
*H04B 17/391* (2015.01)

(52) U.S. Cl.
CPC ..... *H04B 17/0087* (2013.01); *H04B 17/0085* (2013.01); *H04B 17/16* (2015.01); *H04B 17/3912* (2015.01)

(58) Field of Classification Search
CPC ............... H04B 17/0085; H04B 17/0087; H04B 17/16; H04B 17/3912
See application file for complete search history.

(56) References Cited

U.S. PATENT DOCUMENTS

| 10,313,034 B2 | 6/2019 | Rodriguez-Herrera et al. |
| 10,879,966 B2 | 12/2020 | Wang et al. |
| 2006/0233111 A1* | 10/2006 | Wright ............. H04L 43/106 370/241 |

FOREIGN PATENT DOCUMENTS

| CN | 108702186 B | 9/2021 |
| WO | 2015/067957 A1 | 5/2015 |

* cited by examiner

*Primary Examiner* — Jimmy T Vu
(74) *Attorney, Agent, or Firm* — Kowert, Hood, Munyon, Rankin & Goetzel, P.C.; Jeffrey C. Hood; Luke Langsjoen

(57) ABSTRACT

Systems and methods for emulating a channel for wireless communications between a transmit (TX) system-under-test (SUT) and a receive (RX) SUT. The TX and RX SUTs include integrated antenna arrays for transmitting and receiving wireless signals. For a plurality of paths of the emulated channel, and for each antenna element of the TX SUT, a respective phase shift and gain modification is applied to a wireless signals transmitted by the respective antenna element. The phase shifts and gain modifications emulate path length differences between different antenna elements. The signals for each antenna element are summed, and a path-specific modification is applied to each aggregate signal for each path. For each RX antenna element, phase shift and gain modifications are applied to emulate path-length differences for the RX antenna elements, the resultant signals are summed for each path, and the emulated wireless signals are output to the RX antenna elements.

20 Claims, 14 Drawing Sheets

128x128=16,384 virtual paths!

Two Systems (Emulated or Real)
128 RF Ports/SUT

REDUCTION OF EMULATED CHANNEL COUNT FOR PHASED-ARRAY SYSTEMS THROUGH ANGLE-OF-ARRIVAL PROCESSING

PRIORITY DATA

This application claims priority to U.S. Provisional Patent Application No. 63/257,265, titled "Reduction of Emulated Channel Count for Phased-Array Systems Through Angle-of-Arrival Processing" and filed Oct. 19, 2021, which is hereby incorporated by reference in its entirety as though fully and completely set forth herein.

FIELD OF THE INVENTION

The present invention relates to the field of semiconductor testing, and more specifically, to testing of multi-antenna phased-array systems and devices.

DESCRIPTION OF THE RELATED ART

One key requirement for $5^{th}$ Generation (5G) communications is the support of very high data rates. One option to enable higher data rates is to increase the system bandwidth on the order of 1-2 GHz. Contiguous wide bandwidth is in particular available at higher millimeter wave frequencies such as 24 GHz and above. To overcome the high pathloss at those frequencies, antenna array technology is used to steer the radiated energy to a specific direction.

Thus, as $5^{th}$ generation (5G) wireless technology has become more widespread, beamforming millimeter wave technology has rapidly grown in importance. Current user equipment devices, e.g., cell phones, use integrated circuits with integrated antenna arrays for transmitting and/or receiving millimeter wave signals. These antenna arrays need to be characterized and tested over-the-air (OTA) to determine if they satisfy various regulatory requirements.

In particular, smartphones with millimeter wave support are much more challenging to realize than infrastructure components such as base stations because one has to overcome the high blockage through hands etc. Therefore, multiple antenna-in-package (AiP) modules are needed per device. If one assumes 3-4 AiP modules per premium smartphone, one arrives at test volumes of >200M AiP units per year.

Present methods for testing the antennas on these integrated circuits are slow, expensive, and/or suffer various drawbacks such that they are unable to economically test a sufficiently large number of antenna arrays. Improvements in the field, in particular, regarding the size, cost, and speed of a test system for automated production testing of modules and devices integrating active antenna arrays, are desired.

SUMMARY OF THE INVENTION

Various embodiments are presented below of a system and method for testing (e.g., rapidly and inexpensively) devices such as integrated circuits (IC) with integrated antenna arrays configured for wireless transmission and/or reception.

In some embodiments, channel emulation is performed for wireless communications between a first system-under-test (SUT) and a second SUT. The first and second SUTs include respective first and second antenna arrays each comprising a respective plurality of SUT antenna elements.

In some embodiments, for each of a plurality of respective paths of the emulated channel and for each of the plurality of first SUT antenna elements, a respective first phase shift and a respective first gain modification are applied to a respective wireless signal transmitted by the respective first SUT antenna element.

In some embodiments, for each path, the first phase shifted and first gain modified wireless signals corresponding to each of the first SUT antenna elements are summed to produce an aggregate transmitted wireless signal. For each path, a path-specific signal modification is applied to the aggregate transmitted wireless signal, where the path-specific signal modification emulates channel effects of the respective path to produce a respective path-specific aggregate wireless signal.

In some embodiments, for each path and for each of the plurality of second SUT antenna elements, a respective second phase shift and a respective second gain modification are applied to the respective path-specific aggregate wireless signal.

In some embodiments, for each second SUT antenna elements, the second phase shifted and second gain modified path-specific aggregate wireless signals are summed for each of the plurality of paths to produce a respective emulated wireless signal.

In some embodiments, the emulated wireless signals are output to respective ones of the plurality of second SUT antenna elements.

Note that the techniques described herein may be implemented in and/or used with a number of different types of SUTs and/or DUTs, including but not limited to cellular phones, vehicles, portable media players, tablet computers, wearable devices, RF semiconductor components, RF power amplifiers, Front End Modules, transceivers, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiment is considered in conjunction with the following drawings, in which.

Figure 1:
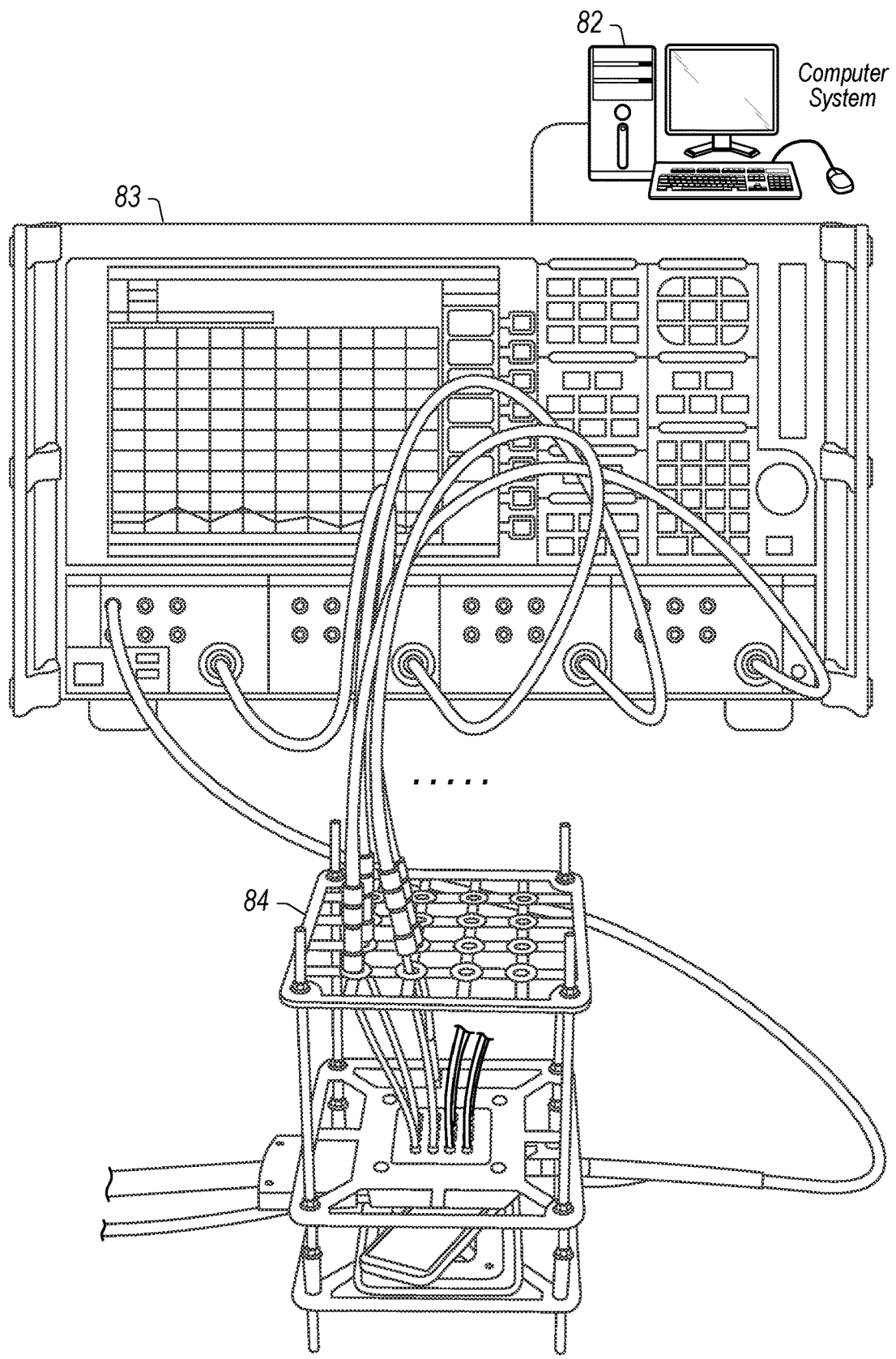
FIG. 1 illustrates an over the air (OTA) testing configuration, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Acronyms

The following is a listing of the acronyms used in the present application:
DUT: Device Under Test
SUT: System Under Test
FF: Far Field
NF: Near Field
EIRP: Effective Isotropic Radiated Power
OTA: Over-the-Air
RF: Radio Frequency
TRP: Total Radiated Power
VNA: Vector Network Analyzer

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. A measurement device may also optionally be further configured as a signal generator to generate signals for provision to a device-under-test. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, a signal generator, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Far-Field (FF) pattern—a pattern of electromagnetic radiation that exists (or is presumed to exist) in a far field region around an object generating the electromagnetic radiation. An antenna, or a plurality of antenna elements, driven by a signal create electromagnetic fields. In general, the observed amplitude and phase of the electromagnetic fields varies with distance of the observer from the radiating object and with angular direction from the object to the observer. The FF pattern refers to the far field pattern of electromagnetic fields around the antenna (or the object containing the antenna), and references the fact that amplitude and phase of these fields observed at some distance from the radiating object and taken relative to a reference point at the same distance will be independent of distance from the object. The FF pattern or gain is a well-known electromagnetic concept.

SUT Interface—one or more antenna probes and potentially supporting parts modifying the collective properties the antenna probes and parts are presenting to the electromagnetic radiation associated with wireless signals and giving structural integrity to their assembly, and which may be used to measure the wireless signals generated by the SUT.

Probe-based field measurement, or field probe measurement of wireless signals—an electromagnetic field measurement made with an antenna probe which is part of the SUT interface. The measurement may comprise determining amplitude and phase of the wireless signals present at the antenna probe. A plurality of probe-based field measurements is the collection of the measurements of all antenna probes belonging to the SUT interface wherein all these measurements may be made for the same one or more wireless signals present at the SUT interface. Here "same wireless signals" may refer to the case where the arrangement and configuration of the SUT, the measurement instrumentation, supporting equipment, and ambient environmental conditions are the same for the measurements made with all the antenna probes of the SUT interface. Different embodiments may choose to make these measurements in various ways and various order, e.g., may perform the measurements on all antenna probes simultaneously or in successive order. A series of a plurality of probe-based field measurements corresponds to multiple of the plurality of probe-based field measurements wherein each one may be made for different wireless signals present at the SUT interface. A field probe measurement may be a near-field probe measurement when the SUT interface and the source of the wireless signal are separated by a near-field distance (either a reactive or radiating near-field distance), and it may be a far-field probe measurement when the separation is a far-field distance.

FIG. 1—OTA Testing System

FIG. 1 illustrates an over the air (OTA) testing system configured to implement embodiments of the techniques disclosed herein, according to some embodiments. Embodiments of a method for OTA testing (e.g., for production testing of integrated circuits) are described below. The system and method for OTA testing may utilize angle-of-arrival processing to emulate a channel with a reduced computational burden, as described herein.

Note that various embodiments of the techniques disclosed herein may be implemented in a variety of different ways. For example, the methods described herein may be performed by software executing on a computer system. However, while some embodiments are described in terms of one or more programs executing on a computer, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As shown in FIG. 1, the OTA test system may include a computer system 82 which couples to a testing apparatus 84. In FIG. 1 the computer system is shown as being a stand-alone computer system separate from the measurement chassis 83. The measurement chassis may in turn be coupled to a testing apparatus 84. Alternatively, the computer may be implemented in the measurement chassis 83. For example, the computer may be implemented as a board or module inserted into a PXI (PCI eXtensions for Instrumentation) chassis form factor. Any of various types of computer system and/or chassis configuration may be used.

Figure 2:
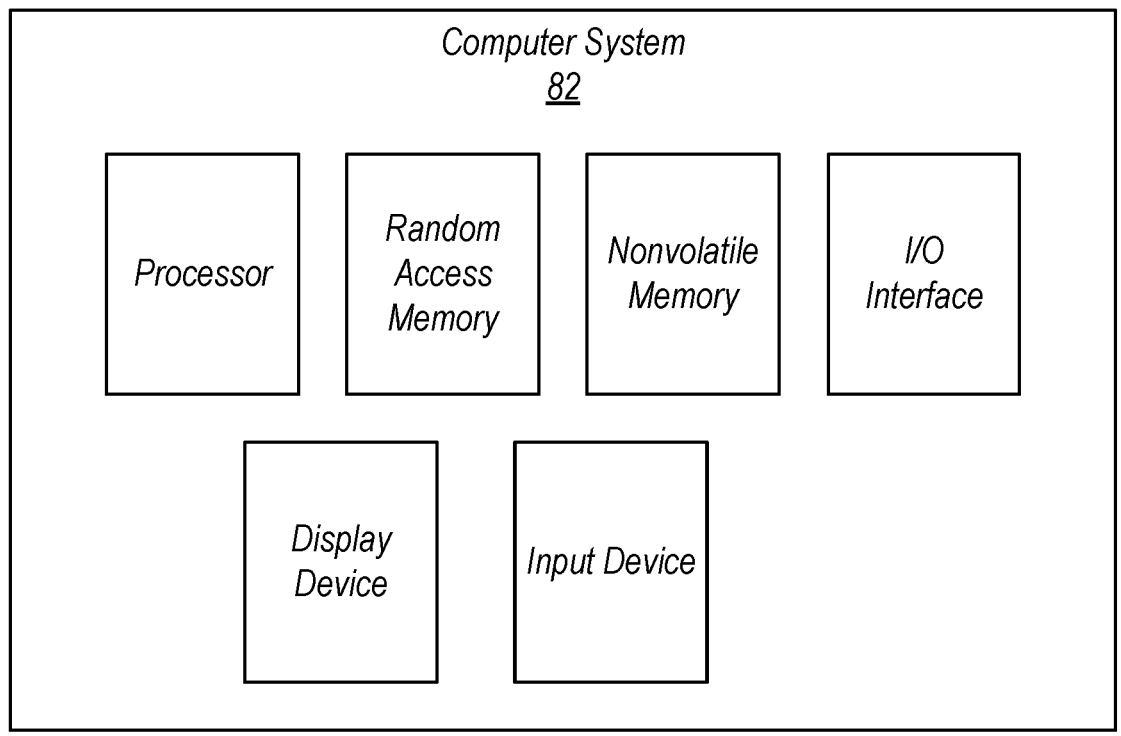
FIG. 2 shows a basic computer system block diagram.

As shown in FIG. 2, the computer system 82 may include a processor, random access memory (RAM), nonvolatile memory, a display device, an input device and an I/O interface for coupling to the testing apparatus 84. For example, the computer system 82 may include at least one memory medium on which one or more computer programs or software components according to one embodiment of the present invention may be stored. For example, the memory medium may store one or more programs that are executable to perform the methods described herein. The memory medium may also store operating system software, as well as other software for operation of the computer system. Various embodiments further include receiving or storing instructions and/or data implemented in accordance with the foregoing description upon a carrier medium.

The testing apparatus 84 may comprise a structure designed to receive one or more devices under test (DUTs) or systems under test (SUTs). The DUT(s)/SUT(s) may be antenna array chips, e.g., a chip which comprises a plurality of antennas, each antenna for generating electromagnetic radiation. The DUT/SUT may also be a user equipment, such as a cell phone, a radar device, or another chip or device that has one or more antennas. The computer system 82 may be coupled to receive one or more wireless signals from the DUT/SUT and/or generate and provide one or more signals to the DUT/SUT or to another (second) DUT/SUT. In some embodiments, the computer system is configured to send digital waveforms to a SUT interface, where the SUT interface then generates signals based on the digital waveforms to send to one or more SUTs. The testing apparatus may include the SUT interface that is configured to measure the electromagnetic signals produced by the antennas of the DUT/SUT and may provide these measured NF electromagnetic signals to the computer system 82 for processing.

In some embodiments, RF signals are directly passed between SUT and SUT interface ports through a cable. In some embodiments, the SUT interface acts as a bridge or insulator between SUT-specific data transmissions and the data movement protocol inside the simulator. Advantageously, users may then develop their own versions of SUT interfaces that then seamlessly plug in into the rest of the system.

In the embodiment shown in FIG. 1, for ease of illustration, only a subset of the DUTs in the testing apparatus 84 are shown as being coupled to the measurement chassis (only a subset of the total number of wires between the testing apparatus 84 and the chassis 83 are shown). However, it is noted that in a typical system all of the antennas in the DUT/SUT of the testing apparatus 84 would be coupled to the measurement chassis 83.

FIG. 2—Computer System Block Diagram

FIG. 2 illustrates a simplified block diagram of the computer system 82. As shown, the computer system 82 may comprise a processor that is coupled to a random access memory (RAM) and a nonvolatile memory. The computer system 82 may also comprise an input device for receiving user input and a display device for presenting output. The computer 82 may also comprise an Input/Output (I/O) interface that is coupled to the testing apparatus 84. The I/O interface may be configured to supply signals to the DUT/SUT in the testing apparatus 84. The I/O interface may further be coupled to the SUT interface and configured to provide digital signals to the SUT interface to cause the SUT interface to send signals to the SUT, and further to receive electromagnetic signals measured by the SUT interface from the SUT.

Figure 4:
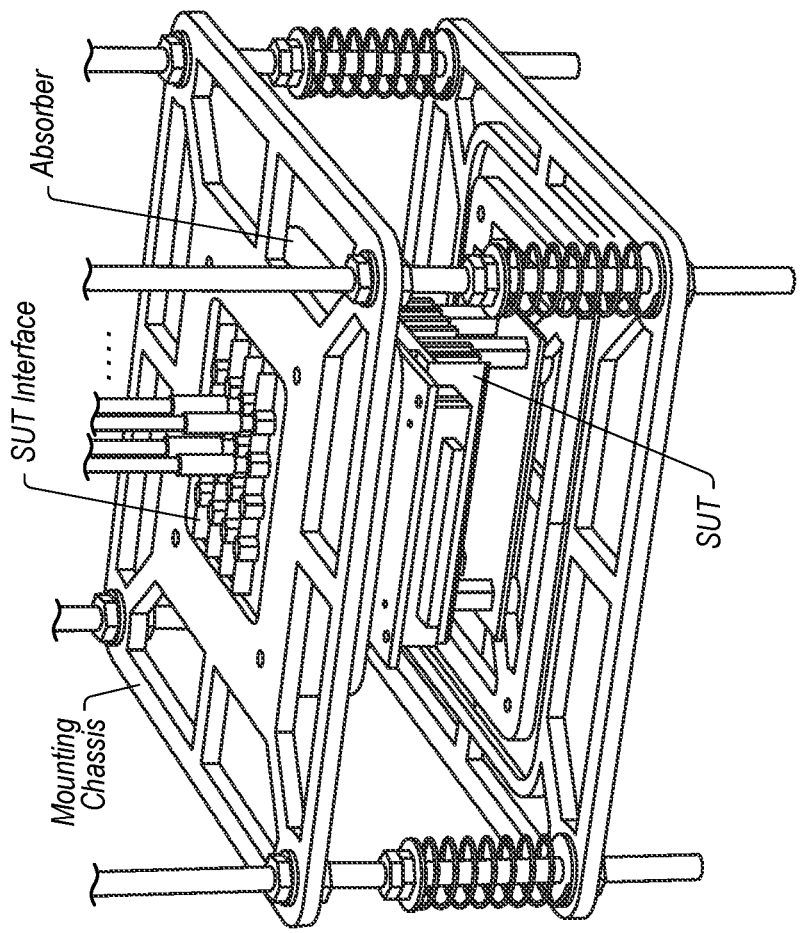
FIGS. 3-4 show examples of a testing apparatus which may support or house a device under test (DUT) and which may also include a SUT interface for measuring electromagnetic signals from the DUT, according to some embodiments.
Figure 3:
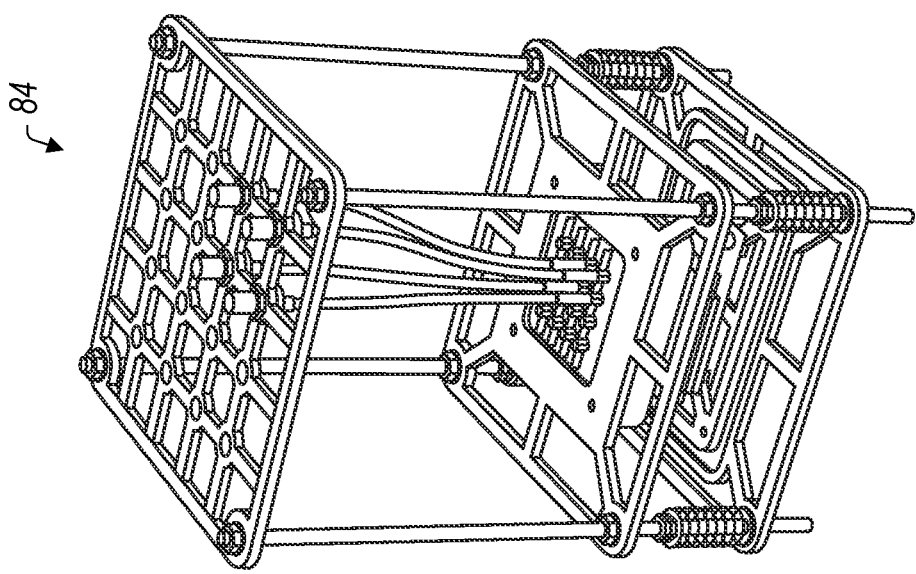

FIGS. 3-4: Testing Apparatus

FIG. 3 shows an embodiment of the testing apparatus 84, and FIG. 4 illustrates the embodiment of FIG. 3 in greater detail. As noted above in FIG. 1, for ease of illustration only a subset or portion of the wires are shown as being connected to the DUT/SUT in FIGS. 3 and 4. As shown in FIG. 3, the testing apparatus 84 may comprise a mounting chassis which is configured to support or hold a SUT interface for measuring near field electromagnetic signals from a DUT/SUT. The testing apparatus 84 may also comprise an absorber positioned around the SUT interface for absorbing undesired electromagnetic signals during the electromagnetic radiation measurements.

As shown in FIG. 4, the mounting chassis is also configured to support or hold a DUT/SUT underneath and proximate to the SUT interface. The testing apparatus 84 may also comprise a first connector coupled to the DUT/SUT and also coupled to the computer system 82 for enabling the computer system to provide stimulus signals to the DUT/SUT, thereby causing the antenna on the DUT/SUT to generate electromagnetic signals. The testing apparatus 84 may also comprise a second connector coupled to the SUT interface and also coupled to the computer system 82 for enabling the computer system to receive the electromagnetic signals measured by the SUT interface.

Emulation of Radio Frequency (RF) Channels for Multiple Antenna Arrays

During the design and manufacturing process of multi-antenna phased array devices, it is often desirable to emulate and/or simulate a variety of different channel conditions to test the functionality of the device. For example, rather than performing the laborious process of transporting transmit (TX) and/or receive (RX) devices to a variety of desired physical environments (to test how the TX and/or RX devices perform in these different environments), a more economical approach is to couple the TX and RX devices through a testing apparatus (such as those shown in FIGS. 1 and 2-3) to receive wireless signals from the TX device, process (e.g., modulate or modify) the signals to emulate a particular channel or environment, and provide these modified wireless signals to the RX device. A large variety of environments/channels may be efficiently emulated by modifying the parameters of the signal modulation.

Figure 5:
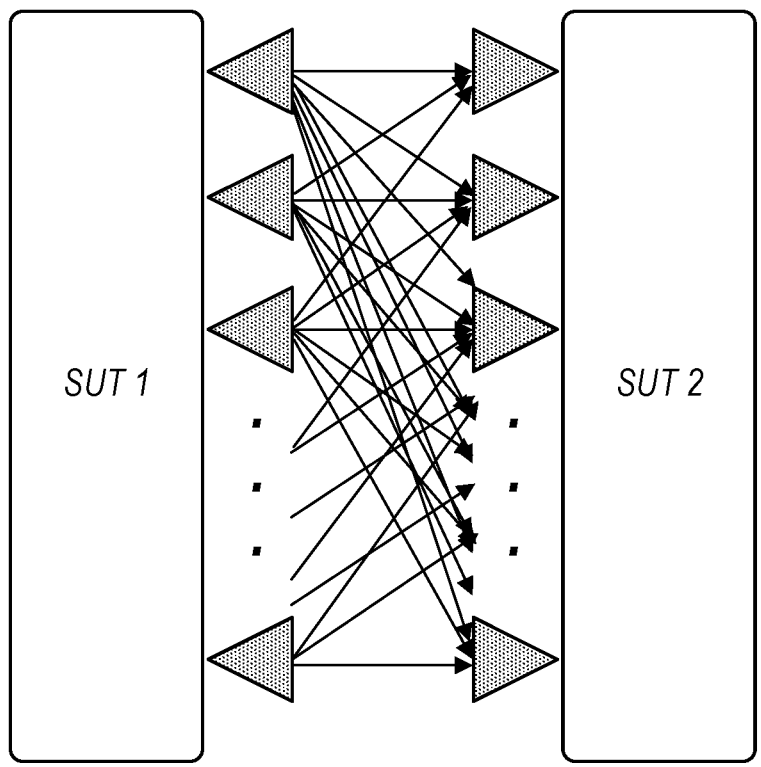
FIG. 5 illustrates how there are 16,384 virtual paths to be emulated between two 128 antenna arrays, according to the prior art.

Large channel count phased-array systems pose difficulties for emulation/simulation of wireless channels. With N elements per array, to completely emulate channels between two arrays, $N^2$ channels will be emulated, as each element in a TX array interacts with each element of an RX array. This emulation process may be manageable for small values of N, but as N gets larger the number of interactions grows parabolically and utilizes an ever-increasing amount of computational power to implement. For example, FIG. 5 illustrates how there are 16,384 virtual paths to be emulated between two 128 antenna arrays.

Figure 6:
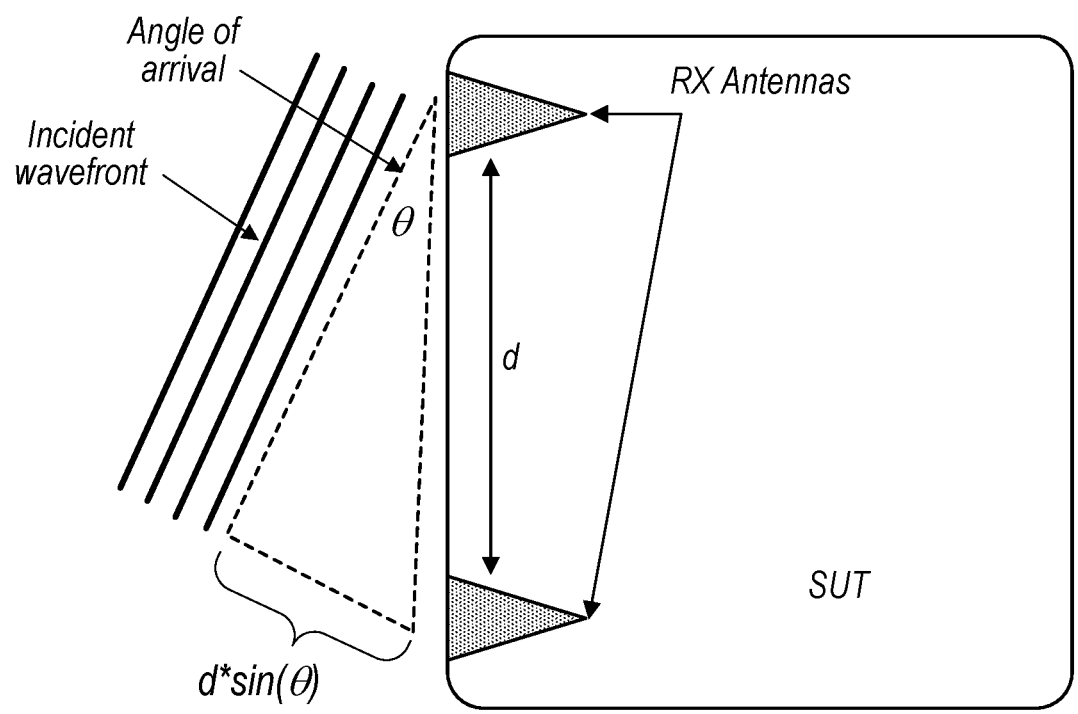
FIG. 6 illustrates an example of how the difference in path length for two RX antenna elements may be estimated based on the angle of arrival θ and the distance between the two antenna elements d, according to some embodiments.

Embodiments herein describe systems and methods to perform channel emulation more efficiently to emulate transmissions between two multi-antenna array devices. In some embodiments, it is utilized that for a sufficiently narrow bandwidth and direction, all elements in a given phase array may see similar signals that differ substantially only in arrival time. The difference in arrival time may be determined from the separation of the elements and the angle from which the wavefront is arriving. FIG. 6 illustrates an example of how the difference in path length for two RX antenna elements may be estimated based on the angle of arrival θ and the distance between the two antenna elements d. Advantageously, rather than emulating N*N channels between two phased-array antennas, embodiments herein emulate a smaller number of channels, depending on the environment to be simulated, and estimate the remaining channels based on the emulated channels and this difference in path length (at both the RX and TX sides). This is enabled on each end of the simulation system by Angle-of-Arrival (AoA) processing, as described in greater detail below.

On the SUT (System Under Test) TX side, by performing measurements of the individual elements' signals and understanding the geometry of the TX SUT, a SUT interface may determine in which direction the transmitter is emitting to align a known antenna radiation pattern. In some embodiments, the SUT interface may receive a single waveform corresponding to a "reference" antenna (instead of separate signals from each of the antennas in the array), information about array geometry relative to that "reference" antenna, and a desired 3D TX direction. A series of processing steps may calculate the emitted signal in any given departure direction. On the RX side, a unique version of the arriving wavefront may be calculated for each of the receiver elements, depending on an emulated arrival direction, center frequency, and separation of the elements.

Figure 7:
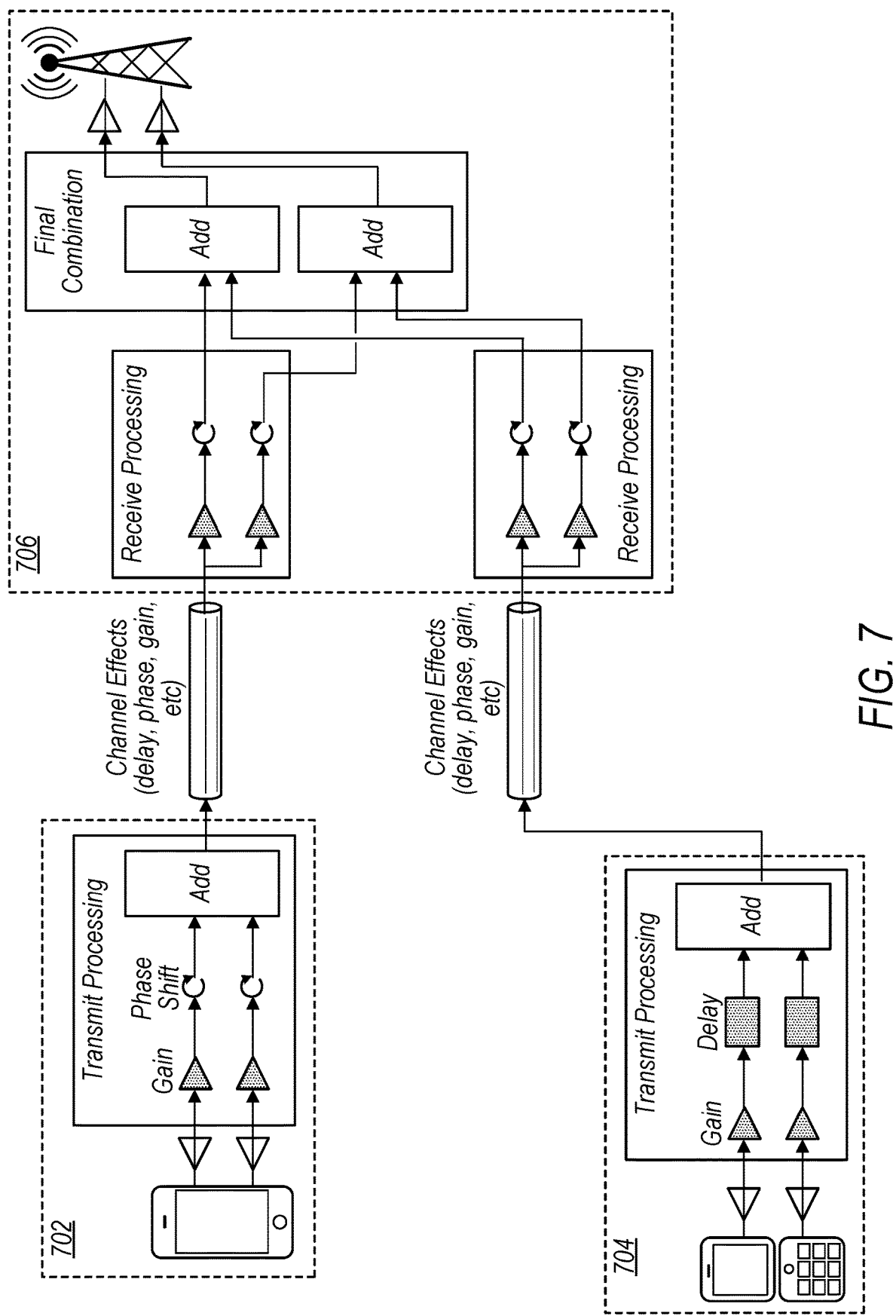
FIG. 7 is a schematic diagram illustrating angle-of-arrival (AoA) processing for two transmit devices transmitting to a single receiver device, according to some embodiments.

A schematic diagram illustrating this processing is shown in FIG. 7, according to some embodiments. As illustrated, two transmit SUT (e.g., cell phones or other types of devices) transmit multi-antenna array signals to one receive SUT (e.g., a base station). Each dotted box may be referred to as a separate "SUT interface". The SUT interfaces for the transmit devices receive signals from each of the transmit device's antennas. Based on the known geometry of the simulated environment and the antenna layout of the SUTs, gain, phase shift, and/or delay may be applied to each of those acquired signals, before they are added together to produce a single signal which is specific to the direction of radiation.

The combined signals may then be modulated through channel effects before arriving at the receiver SUT interface. Within the RX SUT interface, each of the channel effected signals passes through a receive processing block which provides additional gain/phase/delay adjustment, from each channel path signal to each of the receiver SUT antennas. After this receive processing, the signals intended for each of the receiver SUT antennas are added together before being transmitted to the SUT receive antennas.

In previous implementations, the count of channel effects blocks increases rapidly with an increasing number of antennas and SUTs, and this utilizes a significant amount of bandwidth and computation. By utilizing embodiments described herein to pre- and post-process the signals around these channel effects processing blocks, the number of channel effects blocks may be significantly reduced.

Figure 8:
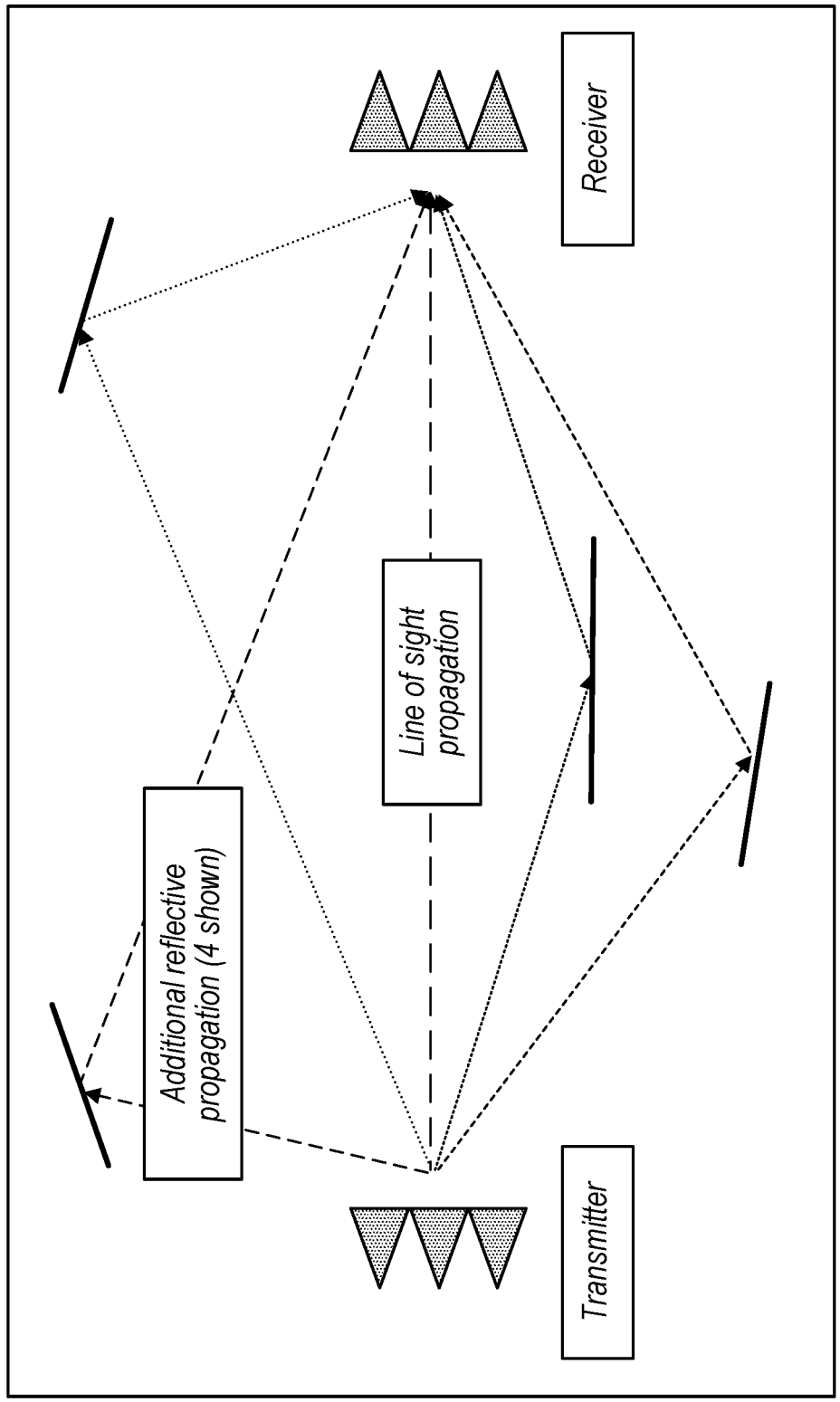
FIG. 8 illustrates an example emulation scenario where the emulator intends to emulate a direct line-of-sight path as well as four additional reflection paths, according to some embodiments.
Figure 9:
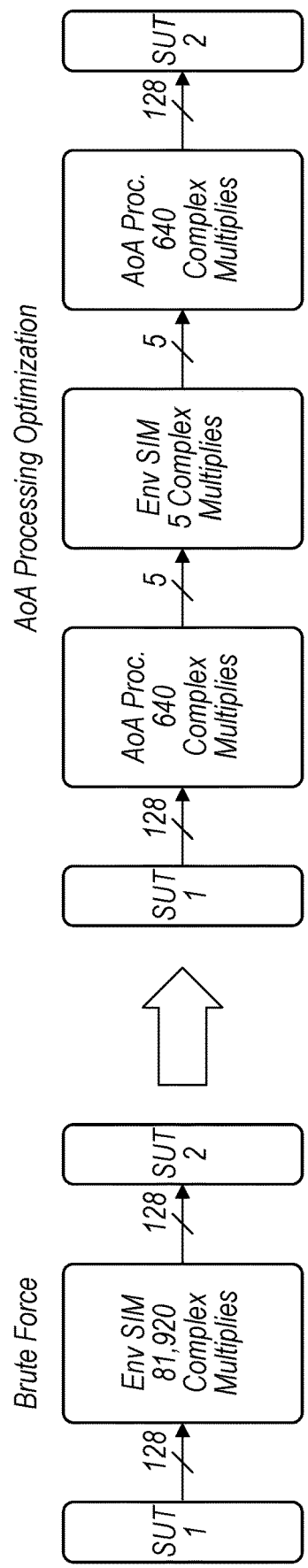
FIG. 9 illustrates the number of complex multiplications to perform channel emulation for both a brute force method and AoA processing, according to some embodiments.

FIG. 8 illustrates an example emulation scenario where the emulator intends to emulate a direct line-of-sight path as well as four additional reflection paths. If each of the transmitter and receiver have N antennas, then a full simulation involves simulating signals propagating between each transmitter and receiver element, for a total N*N simulated channels. If there are 128 antenna elements in each array (real systems can have 100's to 1000's), there are 128*128=16384 channels between pairs of transmitter and receiver antenna elements to process. For each of these channels, if 5 total paths are to be simulated (including reflections, etc), as shown in FIG. 8, that will entail 81,920 total simulated paths. This correspondingly involves 81,920 complex multiplications, as illustrated in FIG. 9. In contrast, embodiments herein that utilize AoA processing are able to simulate the environment in this situation with only 1,285 complex multiplications. However, by making an AoA processing simplification, and by assuming signals only arrive significantly from a smaller number of directions (e.g, depicted as 5 in FIG. 8), the processing burden may be reduced. This may be performed by first calculating the signal propagating in each of the 5 departure directions from the transmitter, then calculating the signal effects unique to each of those signal propagations, and finally calculating the signal each individual receiver element will see based on the arrival directions at the receiver.

An additional benefit of embodiments herein is that bandwidth utilization may be reduced. Part of the overall environment simulation applies a propagation delay corresponding to the simulated distance between SUTs. This delay is typically implemented with random access memory (RAM), which has a finite amount of bandwidth (i.e., a finite amount of data that can be written/read in a given time). With a narrower set of emulated signals, the RAM implementation may be smaller, and the number of bits available for storage in RAM may be shared by fewer signals. Accordingly, each individual signal may be allocated more bits, and therefore a longer delay/distance may be emulated for a given quantity of RAM resources.

Figure 10:
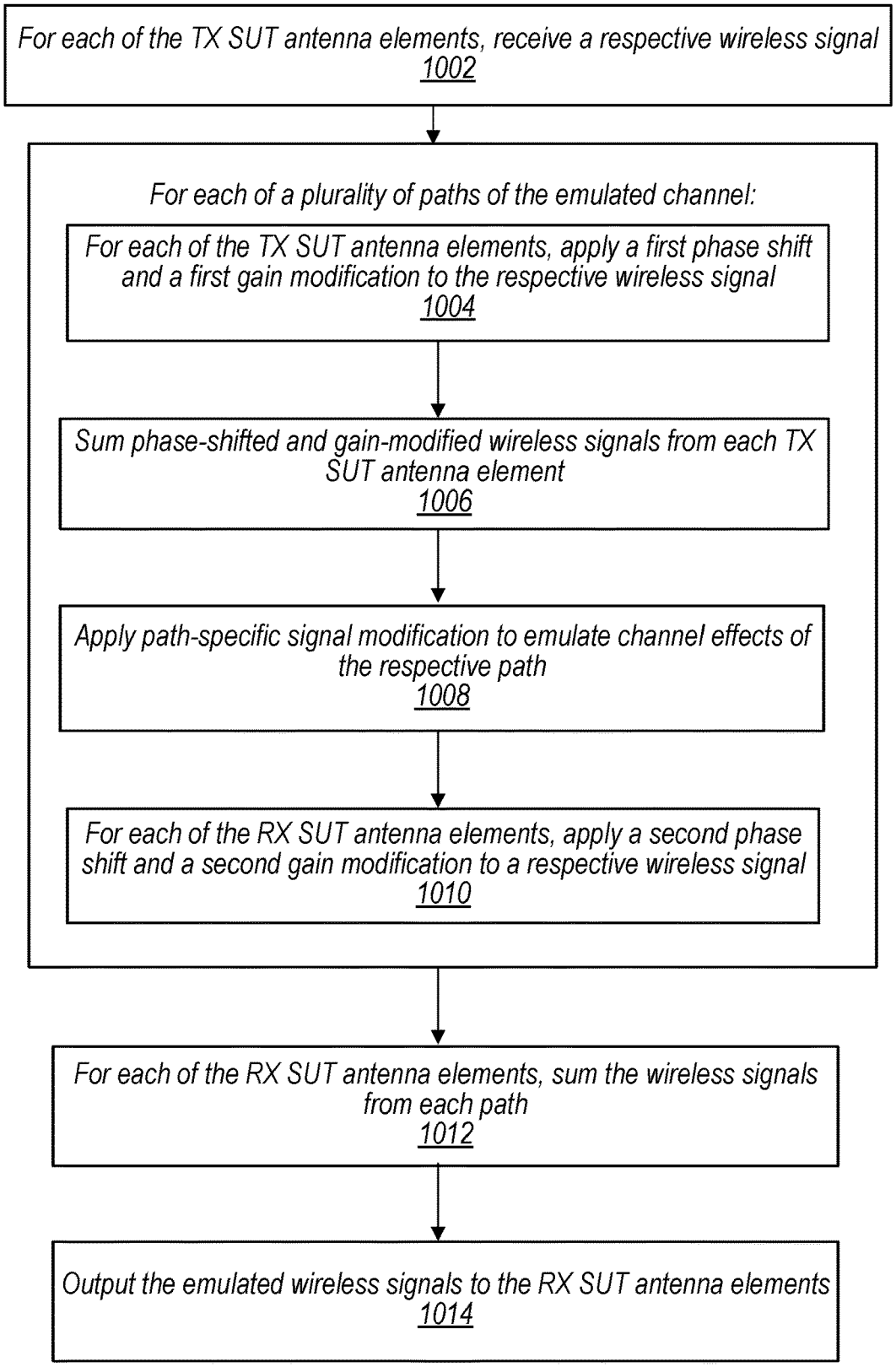
FIG. 10 is a flowchart diagram illustrating a method for emulating or simulating a plurality of paths from respective antenna elements of a multi-antenna phase array TX device to respective antenna elements of a multi-antenna phase array RX device, according to some embodiments.

FIG. 10—Flowchart for Emulating Paths for Phased-Array Antenna Systems

FIG. 10 is a flowchart diagram illustrating a method for emulating or simulating a plurality of paths from respective antenna elements of a multi-antenna phase array TX device to respective antenna elements of a multi-antenna phase array RX device, according to some embodiments. The TX device may be a system-under-test (SUT) or a device-under-test (DUT) that includes a first antenna array comprising a plurality of first SUT antenna elements, and the RX device may be a second SUT or DUT that includes a second antenna array comprising a plurality of second SUT antenna elements.

As used in reference to FIG. 10, the "first SUT" is the TX SUT and the "second SUT" is the RX SUT. In at least some embodiments, a "third SUT" is introduced which is a second TX SUT. The method shown in FIG. 10 may be used in conjunction with any of the computer systems, memory media or devices shown in the above Figures, among other devices. For example, the SUTs may be wireless UEs such as cell phones, laptops, radar-equipped vehicles, base stations, wireless access points, or any of a variety of other types of devices equipped with multi-antenna phase arrays.

In some embodiments, a testing apparatus may be configured to perform steps 1002-1014, wherein the testing apparatus is configured to receive wireless signals from the first SUT, process the signals to produce the channel-emulated signals, and provide the channel-emulated signals to the second SUT.

In some embodiments, a computer system may include a processor and memory, and the memory may store program instructions executable by the processor to perform the method elements described in reference to FIG. 10. In various embodiments, the processor may be a parallel multi-processor system, a field programmable gate array (FPGA), or an application specific integrated circuit (ASIC). In various embodiments, some of the method elements shown may be performed concurrently, in a different order than shown, or may be omitted. Additional method elements may also be performed as desired. As shown, this method may operate as follows.

At 1002, a plurality of wireless signals is received from a plurality of respective first SUT antenna elements. The plurality of wireless signals may be received by one or more antenna elements, which are then converted to digital signals and provided to a computer system for processing. Alternatively, a SUT interface may be directly connected to the antenna elements of the SUT via a wired connection and may be configured to directly receive the signals over the wired connection.

At 1004, for each of a plurality of respective paths of the emulated channel, and for each of the plurality of first SUT antenna elements, a respective first phase shift and a respective first gain modification are applied to a respective wireless signal transmitted by the respective first SUT antenna element. The plurality of paths of the emulated channel may include a direct line of sight path between the first and second SUTs and potentially one or more reflecting paths between the first and second SUTs. Said another way, a wireless signal transmitted by each of the plurality of first SUT antenna elements may be separately emulated as travelling along each of the plurality of paths of the emulated channel. For each wireless signal, and for each path, the first phase shifts and the first gain modifications emulate first path length differences from locations of the first SUT antenna elements along the respective paths. In some embodiments, the first path length differences are calculated according to the expression $d_t * \sin(\theta_t)$, where $d_t$ is a distance from a respective first SUT antenna element to a reference first SUT antenna element, and where $\theta_t$ is an angle-of-transmission of the respective paths. In other words, a reference first SUT antenna element may be selected from the plurality of first antenna elements, and the path length differences may be calculated based on the respective distances of other antenna elements of the array from the location of this reference antenna element. In some embodiments, the reference antenna element may be selected to be at or near the center of the array, to reduce the sum of the distances to all of the other antenna elements. Advantageously, these smaller aggregate distances may enable a simpler phase shifter to be used to steer the beam. In some embodiments, the antenna array may include a plurality of subgroups, and each subgroup may have its own reference antenna element located at or near the center of the respective subgroup.

The first phase shifts may account for the difference in accumulated phase between respective antenna elements and the reference antenna element due to the first path length differences. Similarly, the first gain modifications may account for differences in gain at the RX side that would result from a wireless signal travelling a greater or lesser distance or experiencing a greater or lesser degree of emission pattern shaping.

In some embodiments, the first phase shifts are applied based on a center frequency of the wireless signals transmitted by the first SUT antenna elements. In other embodiments, the first phase shifts are frequency-dependent phase shifts that emulate time delays. The frequency-dependent phase shifts may be implemented at sub-sample precision, or at integer sample precision, in various embodiments.

At 1006, for each of the plurality of respective paths of the emulated channel, a summation of the first phase shifted and first gain modified wireless signals is performed to produce an aggregate transmitted wireless signal. In other words, for each path, the phase shifted and gain modified wireless signals from each of the plurality of first SUT antenna elements are summed together to produce a single aggregate transmitted wireless signal for each path.

At 1008, for each of the plurality of respective paths of the emulated channel, a path-specific signal modification is applied to the aggregate transmitted wireless signal, wherein the path-specific signal modification emulates channel effects of the respective path to produce a respective path-specific aggregate wireless signal. In various embodiments, the path-specific signal modification may include one or more of a complex multiplication to emulate one or both of a path-specific and/or time dependent phase shift and gain modification, a buffering delay to emulate path-specific travel time, signal filtering, and/or signal convolution. Step 1008 will result in a plurality of path-specific aggregate wireless signals, one corresponding to each of the plurality of paths.

In some embodiments, a third SUT including a plurality of third SUT antenna elements may also transmit a plurality of respective signals, which are phase shifted, gain modified, summed, and applied path-specific signal modifications (i.e., steps 1002-1008 may be repeated for another SUT) to produce a plurality of second path-specific aggregate wireless signals (one for each path). The third SUT may be at the same emulated location as the first SUT (so that the plurality of paths of the emulated channel are the same for the first and second SUTs), or alternatively the third SUT may be located at a different emulated location from the first SUT (in which case the third SUT will have its own distinct set of paths through the emulated channel). In these embodiments, the first (from the first SUT) and second (from the third SUT) path-specific aggregate wireless signals may be combined prior to apply the second phase shifts and gain modifications at step 1010.

At 1010, for each of the plurality of respective paths of the emulated channel, and for each of the plurality of second SUT antenna elements of the RX device, a respective second phase shift and a respective second gain modification is applied to the path-specific aggregate wireless signal for the respective path and the respective second SUT antenna element. In some embodiments, the second phase shifts and the second gain modifications emulate second path length differences to locations of the second SUT antenna elements along the respective paths. In some embodiments, the second path length differences are calculated according to the expression $d_r * \sin(\theta_r)$, where $d_r$ is a distance from a respective second SUT antenna element to a reference second SUT antenna element, and where $\theta_r$ is an angle-of-arrival of the respective paths. Similar to the TX-side, the second phase shifts and gain modifications approximate the effect of differing path lengths to different antenna elements of the RX array relative to a reference antenna element.

In some embodiments, the second phase shifts are applied based on a center frequency of the wireless signals transmitted by the first SUT antenna elements. In other embodiments, the second phase shifts are frequency-dependent phase shifts that emulate time delays. The frequency-dependent phase shifts may be implemented at sub-sample precision, or at integer sample precision, in various embodiments. For embodiments where sub-sample precision is utilized, the sub-sample precision of both the first and second phase shifts may be implemented using one of a finite impulse response (FIR) filter, a farrow-structure interpolation filter, an infinite impulse response (IIR) filter, fast Fourier transforms (FFTs) and inverse fast Fourier transforms (IFFTs) (with a complex multiply in between the FFT and the IFFT), or polynomial-based interpolation, among other possibilities, in at least some embodiments.

In some embodiments, an error magnitude associated with frequency-independent first and second phase shifts may be determined. The error magnitude may be determined based on a center frequency and a bandwidth of the wireless signals. Additionally or alternatively, the error magnitude may be calculated based on angles-of-transmission and angles-of-arrival of the wireless signals. In these embodiments, if the calculated error magnitude exceeds an error threshold, frequency-dependent phase shifts that emulate time delays may be utilized, instead of utilizing multiplication by a frequency-independent complex-valued phase shift constant. When the calculated error magnitude is less than the error threshold, frequency-independent phase shifts may be used to reduce the computational burden of the procedure.

At 1012, for each of the plurality of second SUT antenna elements, a summation is performed of the second phase shifted and second gain modified path-specific aggregate wireless signals for each of the plurality of paths to produce a respective emulated wireless signal. Accordingly, a respective emulated wireless signal will be produced for each of the plurality of second SUT antenna elements.

At 1014, the emulated wireless signals are output to respective ones of the plurality of second SUT antenna elements. Each emulated wireless signal emulates the wireless signal that would be received by a respective second SUT antenna element in a physical deployment where the first SUT (and potentially the third, fourth, fifth, SUT, etc., in some embodiments) transmits wireless signals to the RX SUT through a channel. In some embodiments, the emulated wireless signals are transmitted to each RX SUT antenna element through a dedicated wired connection. For example, a transmission wire may be directly connected to provide the respective emulated wireless signal to each of the antenna element of the RX SUT. Alternatively, in some embodiments the emulated wireless signals are provided to each RX SUT antenna element over-the-air by a plurality of near-field (NF) transmitter antenna elements. For example, a TX antenna array may be positioned proximate to (i.e., within the near field) the RX SUT, with a one-to-one positioning of TX antenna elements configured to provide the NF over-the-air emulated signals to respective antenna elements of the RX SUT.

In some embodiments, the first and second SUTs are the same device, such that the pluralities of first and second antenna elements are the same plurality of antenna elements, and the plurality of paths of the emulated channel are reflected paths that are transmitted from and return to the first SUT.

Figure 11:
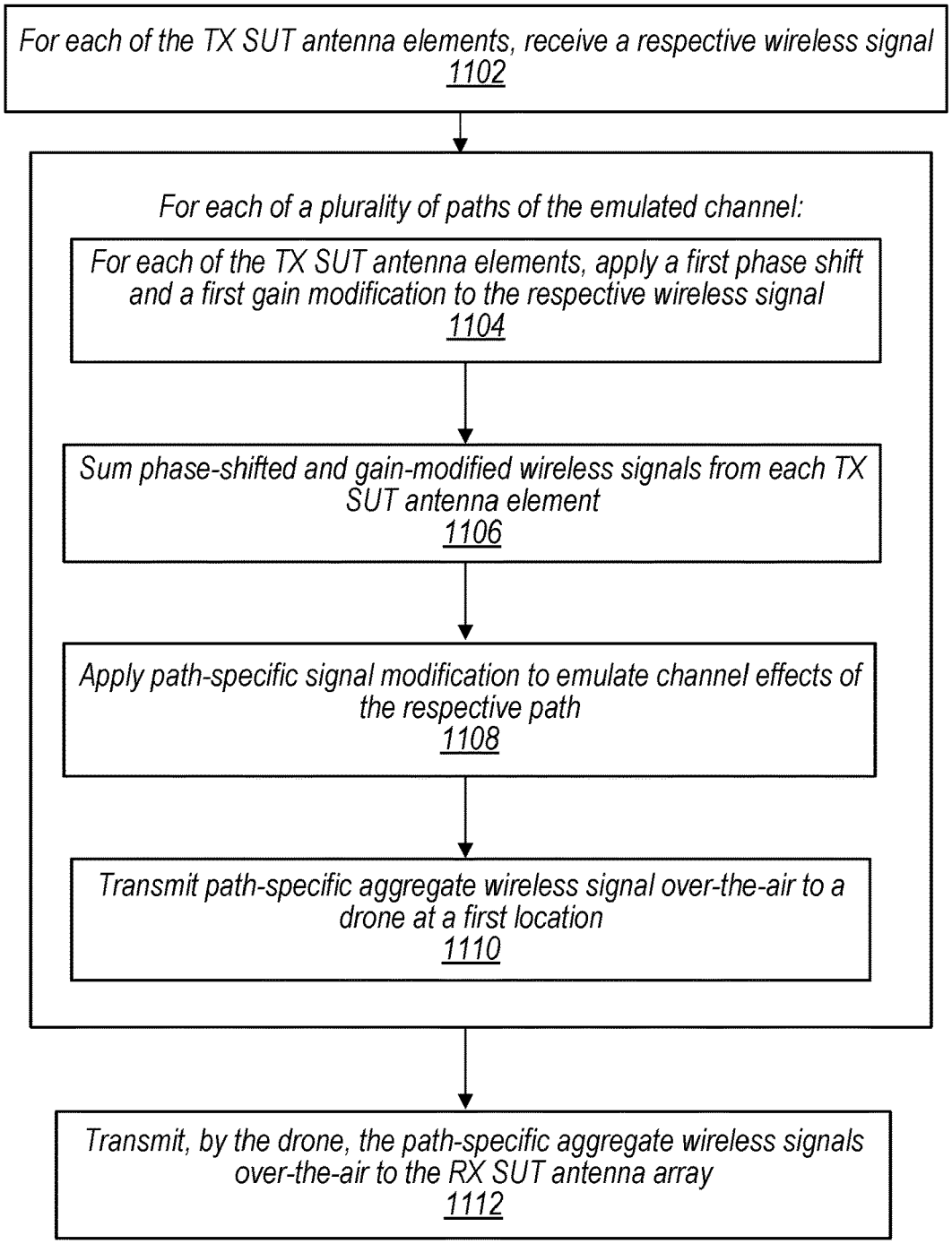
FIG. 11 is a flowchart diagram illustrating a method for emulating or simulating a plurality of paths from respective antenna elements of a multi-antenna phase array TX device to a drone for over-the-air transmission to a multi-antenna phase array RX device, according to some embodiments.

FIG. 11—Flowchart for Emulating Paths for Phased-Array Antenna Systems using a drone SUT interface FIG. 11 is a flowchart diagram illustrating a method for emulating or simulating a plurality of paths from respective antenna elements of a multi-antenna phase array TX device to respective antenna elements of a multi-antenna phase array RX device, according to some embodiments. The TX device may be a system-under-test (SUT) or a device-under-test (DUT) that includes a first antenna array comprising a plurality of first SUT antenna elements, and the RX device may be a second SUT or DUT that includes a second antenna array comprising a plurality of second SUT antenna elements.

As used in reference to FIG. 11, the "first SUT" is the TX SUT and the "second SUT" is the RX SUT. In at least some embodiments, a "third SUT" is introduced which is a second TX SUT. The method shown in FIG. 11 may be used in conjunction with any of the computer systems, memory media or devices shown in the above Figures, among other devices. For example, the SUTs may be wireless UEs such as cell phones, laptops, radar-equipped vehicles, base stations, wireless access points, or any of a variety of other types of devices equipped with multi-antenna phase arrays. In some embodiments, a testing apparatus may be configured to perform steps 1102-1110, wherein the testing apparatus is configured to receive wireless signals from the first SUT, process the signals to produce the channel-emulated signals, and provide the channel-emulated signals to the drone for transmission to the second SUT.

In some embodiments, a computer system may include a processor and memory, and the memory may store program instructions executable by the processor to perform the method elements described in reference to FIG. 11. In various embodiments, the processor may be a parallel multi-processor system, a field programmable gate array (FPGA), or an application specific integrated circuit (ASIC). In various embodiments, some of the method elements shown may be performed concurrently, in a different order than shown, or may be omitted. Additional method elements may also be performed as desired. As shown, this method may operate as follows.

Steps 1102 through 1108 of FIG. 11 proceed similarly to Steps 1002-1008 of FIG. 10, and for brevity their description will not be repeated here. However, the method shown in FIG. 11 diverges from FIG. 10 in the two final steps 1110 and 1112. In some embodiments, at 1110, rather than implementing a dedicated connection to each of the antenna elements of the RX SUT as in FIG. 10, the path-specific aggregate wireless signals are transmitted to a drone 1202 located at a first location "a". The path-specific aggregate wireless signals may be sent as an encoded bit stream to the drone, but the drone may transmit the signals directly (i.e., without encoding the signal as a bit stream) to the RX DUT.

At 1112, the drone transmits the path-specific aggregate wireless signals over-the-air to the antenna elements of the RX SUT. The differences in path lengths to the different antenna elements of the RX SUT is then naturally accommodated through the over-the-air signals (e.g., because the over-the-air transmissions will have different path lengths to different RX antenna elements), removing the step of applying second phase shifts and gain modifications on the signals provided to different RX SUT antenna elements, as is performed in the method shown in FIG. 10. Some RX SUTs may have a large number of antenna elements (e.g., potentially thousands) such that the method of FIG. 10 involves a similarly large number of dedicated channels to transmit a respective signal to each of the antenna elements. Advantageously, the method shown in FIG. 11 may reduce the number of connections to the RX SUT by utilizing a drone to transmit the path-specific aggregate wireless signals to physically implement the path length differences (rather than emulating the path length differences through a second set of phase shift and gain modifications).

Figure 12:
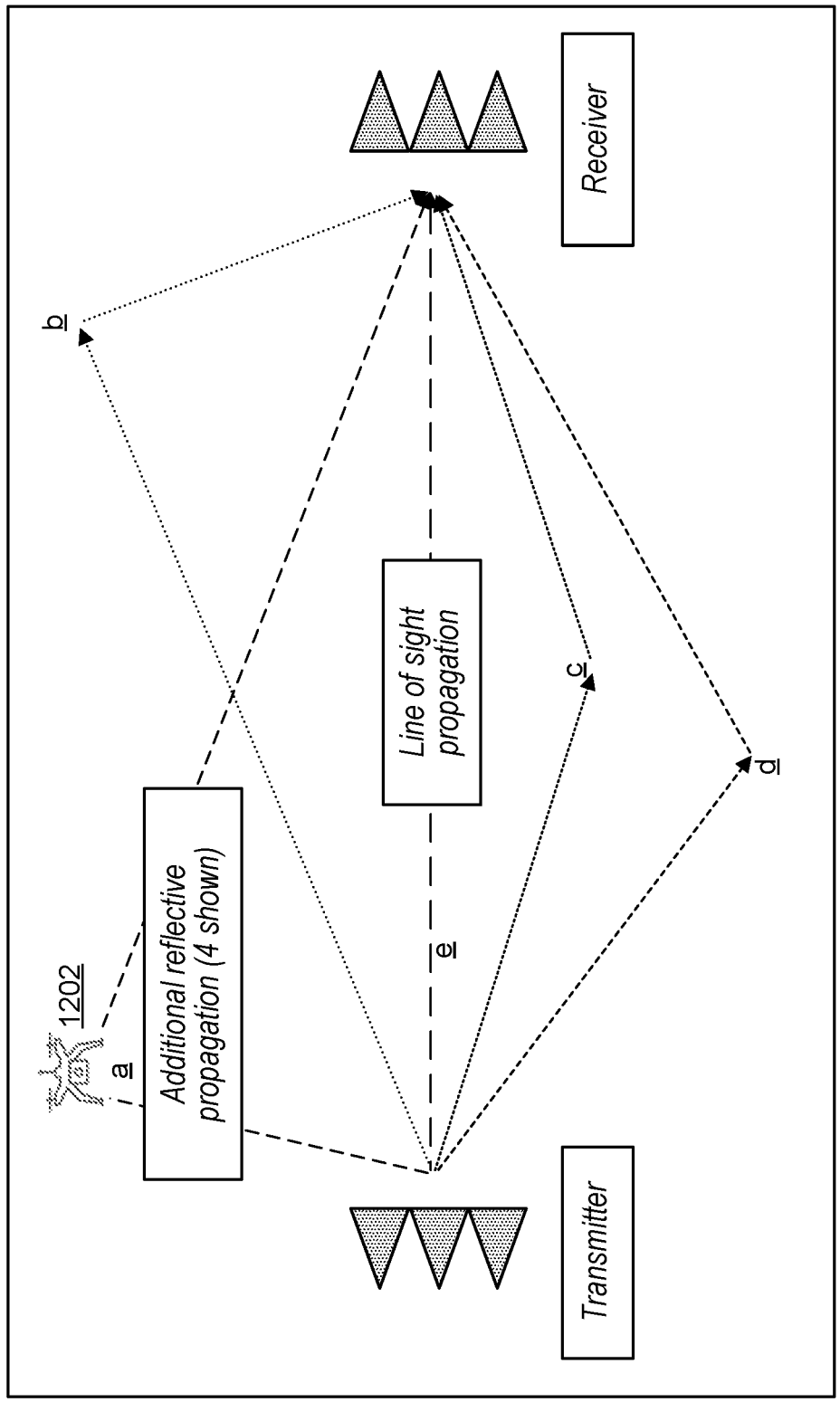
FIG. 12 illustrates an example emulation scenario where a drone is used to emulate a direct line-of-sight path as well as four additional reflection paths, according to some embodiments.

The first location of the drone may be selected based on the desired channel to be emulated. For example, the first location may be selected so that the RX SUT receives the wireless signals from an angle-of-arrival (AoA) that is the same as (or substantially similar to) the AoA of each emulated path. In some embodiments, this process may be repeated for a plurality of different locations to emulate different channels and/or different reflected paths. For example, as shown in FIG. 12, the drone may be flown to a point of reflection "a" that corresponds to a reflective path illustrated in FIG. 8, and may transmit the respective path-specific aggregate wireless signal from this location so that the RX SUT receives the wireless signal from the appropriate direction. The drone may then fly to the locations of each of the additional points of reflection "b-d," as well as a point along the direct path "e", and may transmit the respective path-specific aggregate wireless signal associated with each path from the appropriate respective location.

Additional Description

The following numbered paragraphs provide additional technical description of the described embodiments.

Figure 13:
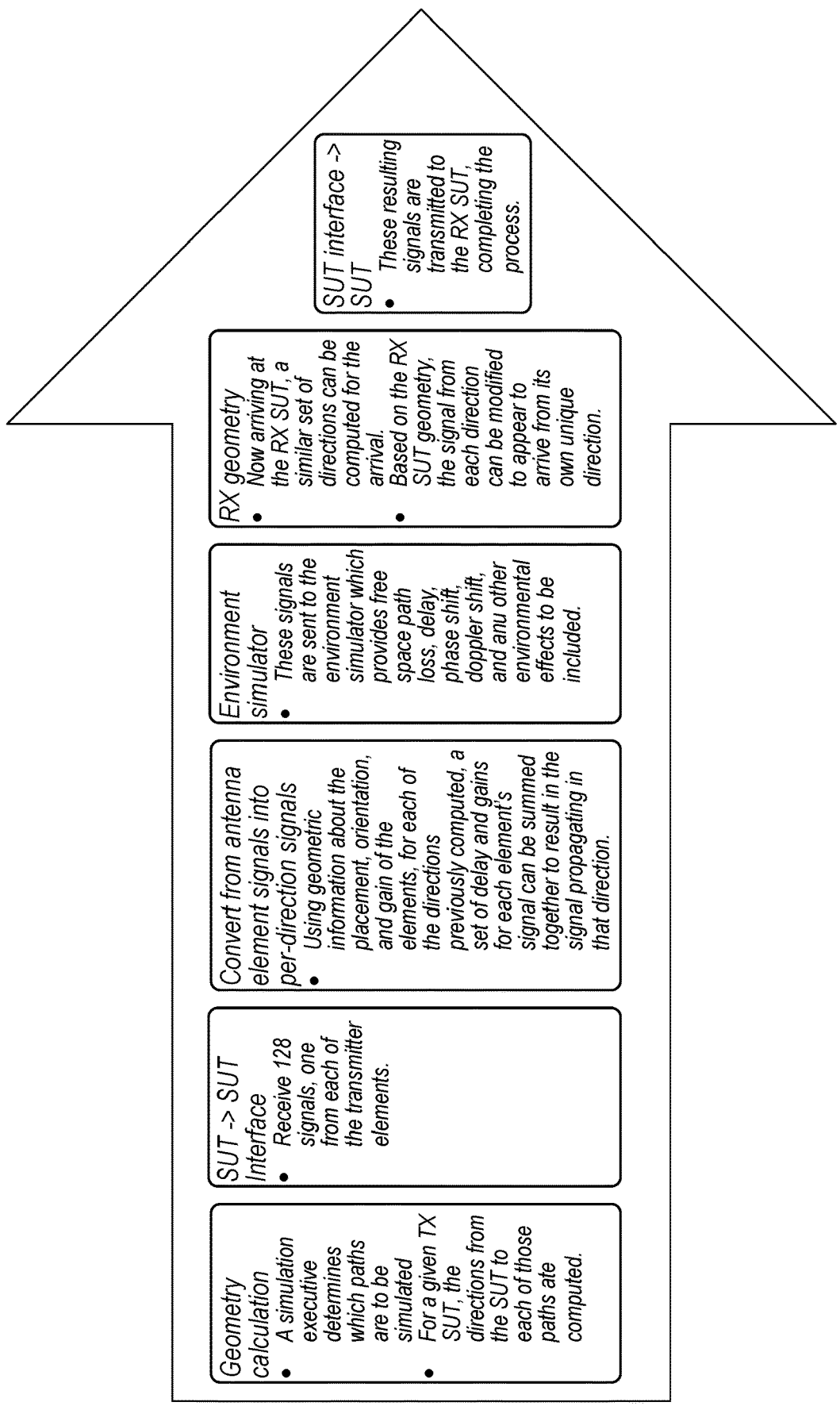
FIG. 13 is a method flow diagram illustrating an example of simulating multiple paths between RX and TX multi-antenna arrays, according to some embodiments.

FIG. 13 is a method flow diagram illustrating an example of simulating multiple paths between RX and TX multi-antenna arrays. As illustrated, the geometry of the environment to be simulated is calculated by a simulation executive, which determines the set of paths to be simulated (e.g., the direct path and potentially one or more reflected paths). The directions from the TX SUT along each of those paths may be computed.

The TX SUT may then transmit a signal from each of its antenna elements to an SUT interface. The received signals may be converted into per-direction signals. For example, using geometric information about the placement, orientation, and gain of the elements, for each of the directions previously computed, a set of delay and gains for each element's signal may be summed together to result in an aggregate signal propagating in that direction.

The environment may then be simulated, where the aggregate signals (one for each simulated path) are sent to an environment simulator which provides free space path loss, delay, phase shift, doppler shift, and potentially other channel and environmental effects to the aggregate signals.

The environment-modulated signals may then be received by the RX SUT, and a set of receive directions (e.g., one for each path) may be computed for the arrival. Based on the RX SUT geometry, the signal from each direction may be modified to appear to arrive from its own unique direction. Finally, the resulting signals may be summed for each path-specific contribution and transmitted from a SUT interface to each of the RX SUT antenna elements, completing the process.

AoA Path Simulation Calculations

For the following discussion, $x_i[n]$ is used to represent the sampled signal of the $i^{th}$ SUT transmit element, and the desired signal to transmit to the SUT receive elements is represented as $y_i[n]$. For non-array SUTs, the relationship between them may be shown with a single path between two SUTs as:

$$y[n]=k*x[n-D] \quad (1)$$

Where D is the simulated delay between transmitter and receiver, and k is a complex-valued coefficient determining the gain and phase of the simulated path. In general, D may be large, utilizing deep memory to implement, and possibly fractional, where it may be desirable to implement sub-sample interpolation for improved accuracy.

Extend this situation to a simulation with several reflections, several of the expressions shown in Eq. (1) may be summed to get the final result:

$$y[n]=\Sigma_{p=1}^{P}k_p*x[n-D_p] \quad (2)$$

Where P is the total number of paths to simulate, and $k_p$ and $D_p$ are unique coefficients and delay values for each of the paths. We may utilize this equation to understand the brute-force implementation describe above, which computes:

$$y_r[n]=\Sigma_{t=1}^{T}\Sigma_{p=1}^{P}k_{p,r,t}*x_t[n-D_{p,r,t}] \quad (3)$$

Where T is the number of transmit antennas, each sampled as $x_t$, and now the coefficients and delay are unique to a path, receiver element, and transmitter element. P*T complex multiplies are depicted in Eq. (3), and because $y_r$ is computed for each of r=1 to R, where R is the number of receive antennas, that becomes a total of P*T*R complex multiplies.

Embodiments described herein improve on these methods and reduce computational complexity. First, the signal being emitted is computed in the chosen path direction(s). If we notate a path's signal as $M_p[n]$, one method to determine the signal in that path's direction can be to apply a phase shift and gain to each of the transmit element signals:

$$M_p[n]=\Sigma_{t=1}^{T}k_{p,t}*x_t[n] \quad (4)$$

This may be repeated for p=1 to P, where P is the number of paths to simulate. At the receiving end, a similar operation can convert from path signals to the individual signal needed to transmit at the SUT receiver:

$$y_r[n]=\Sigma_{p=1}^{P}k_{p,r}*M_p[n] \quad (5)$$

In between, there may be processing done on $M_p$, creating a different version which is delayed, Doppler shifted, etc. In the example shown in Eq. (5) a single complex multiply is shown for each path.

For simplicity, if we temporarily ignore middle processing, calculating $M_p[n]$ involves T multiplies and is done P times, for a total of T*P multiplies at the TX SUT for conversion. Calculating one $y_r[n]$ requires P multiplies, and is done R times, for a total of P*R multiplies at the RX SUT for conversion. Putting those two together gives T*P+P*R multiplies for the entire system. This compares to P*T*R in the brute force solution. Putting our example numbers in, T=R=18, and P=5, for the brute force method this makes 128*128*5=81920. Conversely, for embodiments that utilize AoA processing, 128*5+5*128=1280. Providing dedicated multiplies per path in the environment simulator makes a total of 1285 multiplies, as illustrated in FIG. 9.

Processing Implementations

In various embodiments, there are multiple possibilities for implementing the processing to convert between individual SUT element signals and the combined/simplified signals, which we may refer to as a direction signal or a wavefront. Two possibilities for implementation are utilizing either a phase shift or a time delay, in various embodiments.

Phase-Shift Implementation

First, as a lower-cost option, in some embodiments the wavefront may be simply phase-shifted based on the center frequency. This results in the ideal result being delivered to the SUT elements at the exact center frequency, with increasing error as the bandwidth increases to include frequencies further from the center bandwidth. This error is due to applying a constant phase shift when in a physical system each frequency would have unique frequency-specific phase shifts. For higher center frequencies and lower bandwidths, this approaches the same performance as implementing time delay, and is significantly easier to implement. In fact, this may be implemented with a single complex multiplication.

For example, consider the case of a carrier wave (CW) signal and a SUT RX, and assume we wish to represent that this CW signal comes from a particular direction. If the CW frequency, the distance between antennas, and their directionality are all known, then it is possible to calculate what phase and gain difference can be seen by each antenna. Applying these phases and gains to the common incident signal and then transmitting at each of the antenna elements may produce results close (i.e., within a particular margin of error) to that of placing the transmitter at that direction in open air and doing the measurement physically.

Figure 14:
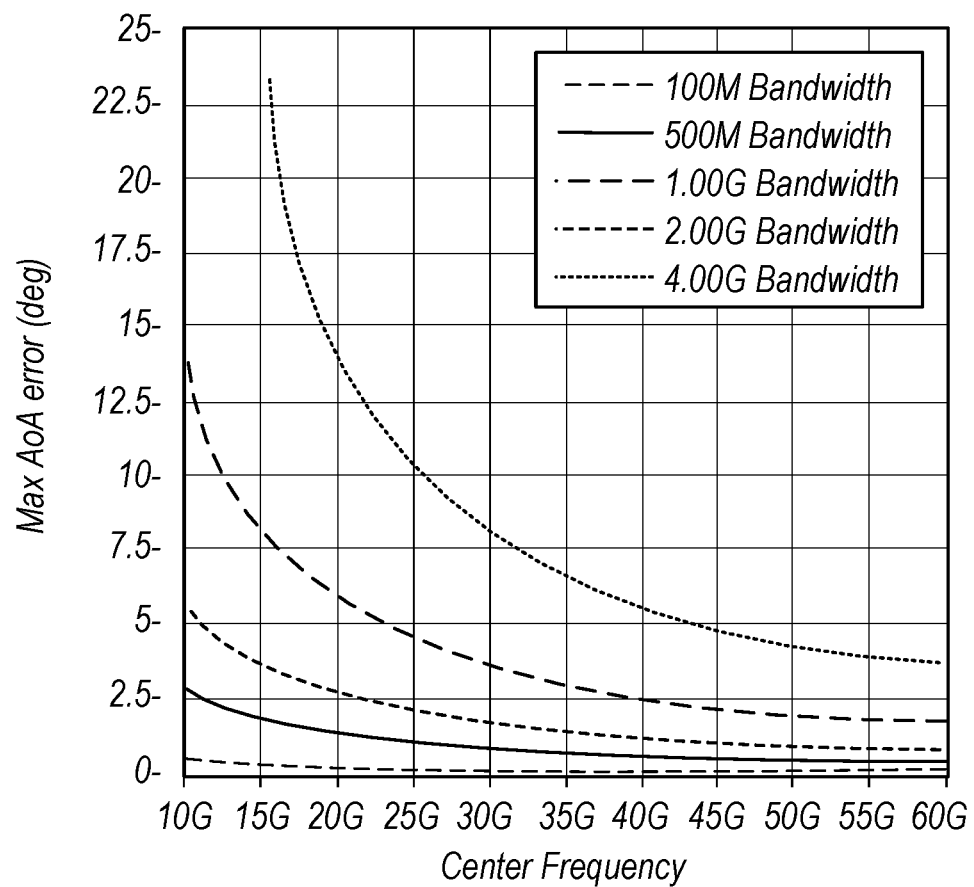
FIG. 14 is a plot of error magnitude as a function of center frequency for a plurality of different bandwidths, according to some embodiments.

However, the difference in phase measured at two receive antenna elements for a given wavefront direction depends on the CW frequency. If we expand this example to a wider bandwidth, now frequencies that are not close to the center of the band are included, and these will not get exactly the right phase shift as if they arrived from the intended direction. Instead, some amount of error will be introduced, which can be quantified. The average error across the band may be much less as it is positive in one direction and negative in the other (hence at least partially cancelling out), but the overall shape is similar to that shown in FIG. 14, increasing with bandwidth and steering angle, and decreasing with center frequency.

Time Delay Implementation

Second, the antenna element specific path difference may be simulated using time delays. Using a time delay (which effectively results in a frequency-dependent phase-shift) results in a more accurate way in DSP (Digital Signal Processing) to convert between the individual antenna signals and a combined signal in the TX or RX direction. To implement this option, the baseband data may be delayed by a sub-sample value, followed by a phase shift to account for the delay of the carrier at RF. The primary benefit of this method is that each frequency ends up phase-shifted by an amount that depends on the frequency. This means that for all frequencies in band, the AoA physics/math (e.g. $d*\sin(\theta)$) remains accurate. However, implementing a time delay is computationally costly in DSP compared to a frequency-independent phase shift.

Figure 15:
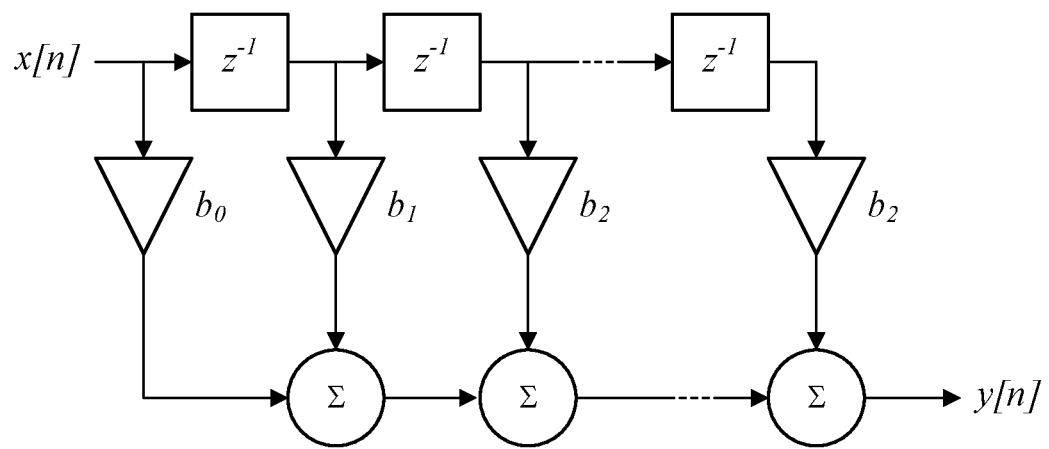
FIG. 15 is a flow diagram illustrating implementation of a finite impulse response (FIR) filter, according to some embodiments.

Time delay can be implemented at the sub-sample level in several ways, including but not limited to a Finite Impulse Response (FIR) Filter or a fast Fourier transform (FFT)/inverse fast Fourier transform (IFFT). An all-pass FIR filter is illustrated in FIG. 15, and may be used to implement sub-sample delay without concern for alias rejection, as no frequency images or aliases are created in the process. This dedicated filter may be of lower order than those put into the fractional resamplers, which saves on implementation size.

A FFT/IFFT process may also be done in the frequency domain. For example, the DSP may first convert into the frequency domain, and then each individual frequency bin may be rotated by a different amount before being returned to the time domain.

Cost of AoA Processing

Integer Only: For integer-only AoA processing, the computational cost is cheaper than sub-sample precision. However, that may produce delay in increments of the sample period. Integer-only precision may be desirable for particularly high sample rates with additional interpolation, as one example. In some embodiments, constructive and destructive interference may occur at both the RF center frequency and in the baseband. A single complex multiplication may accommodate for interference in the RF but not also for the delay in the baseband. Inserting an integer delay is a simple intervention that may improve certain use cases by a significant amount. For example, for a particular array, the phase difference of 5 samples generated along the entire length of the antenna array may result in destructive interference in the base band. Narrow frequency band power loss due to baseband interference may be as large as 30 dB, so recovering even 20% of that through an integer delay may result in a 6 dB increase in the detection levels, substantially improving performance.

Phase Shift: A phase shift may be implemented with a complex multiply against an input data stream. Each complex multiply requires minimum 3 DSP for DSP48-based FPGAs, or 2 DSP for DSP58-based FPGAs, and this value may be multiplied by the parallelism of the datapath or samples per cycle (SPC).

FIR: For a slight amount of penalty in IBW, $9^{th}$ order filters with 10 multiplies per sample produce a reasonably performant implementation. These coefficients are real, but applied to a complex signal, so 20 multiplies, and must be multiplied again by the parallelism or SPC. Similar to the integer-only implementation, following the FIR, a phase shift may also be used to account for the shift in center frequency phase, as this is 0 Hz at baseband and not affected by any time delay at baseband.

While embodiments herein are described in terms of transmission and reception of wireless signals, in other embodiments the signals may be virtual signals that are "transmitted", "modulated" and "received" digitally. In other words, rather than physically transmitting wireless signals to a testing apparatus, equivalent data streams may be provided to a computer system (e.g., an FPGA system) for processing and environment emulation.

While embodiments herein are described in the context of multi-antenna Tx and Rx arrays, the described methods may also be used for single antenna transmitters and receivers. Further, while exemplary embodiments are described in terms of SUTs, more general types of transmitters and receivers such as test equipment (i.e., equipment used to stimulate a wireless signal environment that are not themselves "under test") may also be used in conjunction with the described method steps. In some embodiments, the Rx SUT and the Tx SUT are the same device, and the emulated paths are reflected paths that are reflected back to the SUT.

In some embodiments, the described methods may be performed by a standard computer processor coupled to memory. Alternatively, in some embodiments a programmable hardware element may be utilized to perform the described methods. A programmable hardware element may include various hardware devices comprising multiple programmable function blocks connected via a programmable interconnect. Examples include FPGAs (Field Programmable Gate Arrays), PLDs (Programmable Logic Devices), FPOAs (Field Programmable Object Arrays) and CPLDs (Complex PLDs). The programmable function blocks may range from fine grained (combinatorial logic or look up tables) to coarse grained (arithmetic logic units, graphics processing units (GPUs), or processor cores). A programmable hardware element may also be referred to as "reconfigurable logic". As another option, an integrated circuit with dedicated hardware components such as an Application Specific Integrated Circuit (ASIC) may be used to perform the described method steps.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for emulating a channel for wireless communications between a first system-under-test (SUT) and a second SUT, wherein the first SUT includes a first antenna array comprising a plurality of first SUT antenna elements, and wherein the second SUT includes a second antenna array comprising a plurality of second SUT antenna elements, the method comprising:
from the plurality of first SUT antenna elements, receiving a plurality of respective wireless signals;
for each of a plurality of respective paths of the emulated channel:
for each of the plurality of first SUT antenna elements:
applying a respective first phase shift and a respective first gain modification to the respective wireless signal received from the respective first SUT antenna element;
performing a summation of the first phase shifted and first gain modified wireless signals to produce an aggregate transmitted wireless signal;
applying a path-specific signal modification to the aggregate transmitted wireless signal, wherein the path-specific signal modification emulates channel effects of the respective path to produce a respective path-specific aggregate wireless signal;
for each of the plurality of second SUT antenna elements:
applying a respective second phase shift and a respective second gain modification to the respective path-specific aggregate wireless signal; and
for each of the plurality of second SUT antenna elements:
performing a summation of the second phase shifted and second gain modified path-specific aggregate wireless signals for each of the plurality of paths to produce a respective emulated wireless signal; and
outputting the emulated wireless signals to respective ones of the plurality of second SUT antenna elements.

2. The method of claim 1,
wherein the first phase shifts and the first gain modifications emulate first path length differences from locations of the first SUT antenna elements along the respective paths, and
wherein the second phase shifts and the second gain modifications emulate second path length differences to locations of the second SUT antenna elements along the respective paths.

3. The method of claim 2,
wherein the first path length differences are calculated according to the expression $d_t*\sin(\theta_t)$, wherein $d_t$ is a distance from a respective first SUT antenna element to a reference first SUT antenna element, wherein $\theta_t$ is an angle-of-transmission of the respective paths, and
wherein the second path length differences are calculated according to the expression $d_r*\sin(\theta_r)$, wherein $d_r$ is a distance from a respective second SUT antenna element to a reference second SUT antenna element, and wherein $\theta_r$ is an angle-of-arrival of the respective paths.

4. The method of claim 1,
wherein the first and second phase shifts are frequency-independent and are applied based on a center frequency of the wireless signals transmitted by the first SUT antenna elements.

5. The method of claim 1,
wherein the first and second phase shifts comprise frequency-dependent phase shifts that emulate time delays.

6. The method of claim 5,
wherein the frequency-dependent phase shifts are implemented at sub-sample precision, or
wherein the frequency-dependent phase shifts are implemented at integer sample precision.

7. The method of claim 6, wherein the sub-sample precision is implemented using one of:
a finite impulse response (FIR) filter;
a farrow-structure interpolation filter;
an infinite impulse response (IIR) filter;
fast Fourier transforms (FFTs) and inverse fast Fourier transforms (IFFTs); or
polynomial-based interpolation.

8. The method of claim 1, the method further comprising:
determining an error magnitude associated with the first and second phase shifts, wherein the error magnitude is based at least in part on a center frequency and a bandwidth of the wireless signals; and
determining whether the first and second phase shifts comprise frequency independent phase shifts or frequency-dependent phase shifts that emulate time delays based at least in part on whether the error magnitude exceeds an error threshold.

9. The method of claim 1, the method further comprising:
determining an error magnitude associated with the first and second phase shifts, wherein the error magnitude is based at least in part on angles-of-transmission and angles-of-arrival of the wireless signals; and
determining whether the first and second phase shifts comprise frequency independent phase shifts or frequency-dependent phase shifts that emulate time delays based at least in part on whether the error magnitude exceeds an error threshold.

10. The method of claim 1,
wherein the path-specific signal modification comprises one or more of:
a complex multiplication to emulate one or both of a path-specific phase shift and gain modification;
a buffering delay to emulate path-specific travel time;
signal filtering; and
signal convolution.

11. The method of claim 1,
wherein the plurality of paths of the emulated channel comprises:
a direct line of sight path between the first and second SUTs; and
one or more reflecting paths between the first and second SUTs.

12. The method of claim 1, the method further comprising:
repeating said applying the respective phase shifts and gain modifications, said performing the summations, and said applying the path-specific signal modifications to wireless signals transmitted by a plurality of third SUT antenna elements of a third SUT for each of a second plurality of respective paths of the emulated channel to produce a plurality of respective second path-specific aggregate wireless signals; and for each respective path of the plurality of paths, combining the respective path-specific aggregate wireless signal and the respective second path-specific aggregate wireless signal prior to applying the respective second phase shifts and second gain modifications.

13. The method of claim 1,
wherein the first SUT is the second SUT,
wherein the plurality of first SUT antenna elements are the plurality of second SUT antenna elements, and
wherein the plurality of paths of the emulated channel comprises reflected paths that return to the first SUT.

14. The method of claim 13,
wherein the first SUT comprises a radar-equipped vehicle.

15. A system for emulating a channel for wireless communications between a first system-under-test (SUT) and a second SUT, wherein the first SUT includes a first antenna array comprising a plurality of first SUT antenna elements, and wherein the second SUT includes a second antenna array comprising a plurality of second SUT antenna elements, wherein the system comprises:
a testing apparatus configured to receive wireless signals from the first SUT and provide path-emulated wireless signals to the second SUT; and
a computer system comprising a processor and memory, wherein the memory stores program instructions executable by the processor to cause the system to:
for each of a plurality of respective paths of the emulated channel:
for each of the plurality of first SUT antenna elements:
apply a respective first phase shift and a respective first gain modification to a respective wireless signal transmitted by the respective first SUT antenna element;
perform a summation of the first phase shifted and first gain modified wireless signals to produce an aggregate transmitted wireless signal;
apply a path-specific signal modification to the aggregate transmitted wireless signal, wherein the path-specific signal modification emulates channel effects of the respective path to produce a respective path-specific aggregate wireless signal;
for each of the plurality of second SUT antenna elements:
apply a respective second phase shift and a respective second gain modification to the respective path-specific aggregate wireless signal; and
for each of the plurality of second SUT antenna elements:
perform a summation of the second phase shifted and second gain modified path-specific aggregate wireless signals for each of the plurality of paths to produce a respective emulated wireless signal; and
output the emulated wireless signals to respective ones of the plurality of second SUT antenna elements.

16. The system of claim 15,
wherein the first phase shifts and the first gain modifications emulate first path length differences from locations of the first SUT antenna elements along the respective paths,
wherein the first path length differences are calculated according to the expression $d_t * \sin(\theta_t)$, wherein $d_t$ is a distance from a respective first SUT antenna element to a reference first SUT antenna element, wherein $\theta_t$ is an angle-of-transmission of the respective paths,
wherein the second phase shifts and the second gain modifications emulate second path length differences to locations of the second SUT antenna elements along the respective paths, and
wherein the second path length differences are calculated according to the expression $d_r * \sin(\theta_r)$, wherein $d_r$ is a distance from a respective second SUT antenna element to a reference second SUT antenna element, and wherein $\theta_r$ is an angle-of-arrival of the respective paths.

17. The system of claim 15,
wherein the processor comprises one of:
a parallel multi-processor system;
a field programmable gate array (FPGA); or
an application specific integrated circuit (ASIC).

18. A non-transitory computer readable memory medium comprising program instructions wherein the program instructions are executable by a processor to:
emulate a channel for wireless communications between a first system-under-test (SUT) and a second SUT, wherein the first SUT includes a first antenna array comprising a plurality of first SUT antenna elements, and wherein the second SUT includes a second antenna array comprising a plurality of second SUT antenna elements, wherein, in emulating the channel, the program instructions are executable to:
for each of a plurality of respective paths of the emulated channel:
for each of the plurality of first SUT antenna elements:
apply a respective first phase shift and a respective first gain modification to a respective wireless signal transmitted by the respective first SUT antenna element;
perform a summation of the first phase shifted and first gain modified wireless signals to produce an aggregate transmitted wireless signal;
apply a path-specific signal modification to the aggregate transmitted wireless signal, wherein the path-specific signal modification emulates channel effects of the respective path to produce a respective path-specific aggregate wireless signal;
providing the respective path-specific aggregate wireless signal to a drone located at a first location for transmission to the plurality of second SUT antenna elements.

19. The non-transitory computer readable memory medium of claim 18,
wherein the first phase shifts and the first gain modifications emulate first path length differences from locations of the first SUT antenna elements along the respective paths,
wherein the first path length differences are calculated according to the expression $d_t * \sin(\theta_t)$, wherein $d_t$ is a distance from a respective first SUT antenna element to a reference first SUT antenna element, wherein $\theta_t$ is an angle-of-transmission of the respective paths.

20. The non-transitory computer readable memory medium of claim 18,
wherein the first location of the drone is selected based at least in part on the emulated channel.

* * * * *